United States Patent
Horie et al.

(10) Patent No.: US 10,946,557 B2
(45) Date of Patent: *Mar. 16, 2021

(54) RELEASE AGENT FOR VULCANIZED RUBBER MOLDING

(71) Applicant: DAI-ICHI KOGYO SEIYAKU CO., LTD., Kyoto (JP)

(72) Inventors: Takuya Horie, Kyoto (JP); Toshikazu Nabeshima, Kyoto (JP); Kazunori Nakagawa, Kyoto (JP)

(73) Assignee: DAI-ICHI KOGYO SEIYAKU CO., LTD., Kyoto (JP)

( * ) Notice: Subject to any disclaimer, the term of this patent is extended or adjusted under 35 U.S.C. 154(b) by 245 days.

This patent is subject to a terminal disclaimer.

(21) Appl. No.: 16/301,358

(22) PCT Filed: Apr. 26, 2017

(86) PCT No.: PCT/JP2017/016476
§ 371 (c)(1),
(2) Date: Nov. 13, 2018

(87) PCT Pub. No.: WO2017/195593
PCT Pub. Date: Nov. 16, 2017

(65) Prior Publication Data
US 2019/0193307 A1 Jun. 27, 2019

(30) Foreign Application Priority Data
May 13, 2016 (JP) .............................. JP2016-097213

(51) Int. Cl.
*B29C 33/62* (2006.01)
*C08G 65/26* (2006.01)

(52) U.S. Cl.
CPC .......... *B29C 33/62* (2013.01); *C08G 65/2609* (2013.01); *C08G 65/2612* (2013.01); *C08G 65/2624* (2013.01); *C08G 2650/58* (2013.01)

(58) Field of Classification Search
CPC .. C09D 171/00; C09D 171/02; C09D 171/08; C08G 65/2663; C08G 65/1202; C08G 65/2603; C08G 65/2606; C08G 65/2618; C08G 65/2636; C08G 65/2639
See application file for complete search history.

(56) References Cited

U.S. PATENT DOCUMENTS

2010/0029899 A1* 2/2010 Sakanoue ........ C08G 65/33396
528/425

FOREIGN PATENT DOCUMENTS

JP 7-292236 A 11/1995

OTHER PUBLICATIONS

International Search Report for PCT/JP2017/016476 dated Jun. 6, 2017.
Written Opinion of the International Searching Authority for PCT/JP2017/016476 (PCT/ISA/237) dated Jun. 6, 2017.
Chinese Office Action and Search Report for Chinese Application No. 201780029667.6, dated Mar. 9, 2020, with an English translation.

* cited by examiner

*Primary Examiner* — Shane Fang
(74) *Attorney, Agent, or Firm* — Birch, Stewart, Kolasch & Birch, LLP

(57) ABSTRACT

A release agent for vulcanized rubber molding is provided which has excellent mold releasing properties and washability. This release agent for vulcanized rubber molding contains an alkylene oxide adduct (A) of an active hydrogen group-containing compound having four active hydrogen atoms in the molecule, wherein the aforementioned alkylene oxide adduct (A) of an active hydrogen group-containing compound has a number average molecular weight of 5000-30000, and contains 50-95 mass % of an oxyethylene group.

6 Claims, No Drawings

RELEASE AGENT FOR VULCANIZED RUBBER MOLDING

TECHNICAL FIELD

The present invention relates to a release agent for vulcanized rubber molding.

BACKGROUND ART

The vulcanized rubber is used for automotive components, rail components, construction machines, etc. Such vulcanized rubber is obtained by charging unvulcanized rubber into a mold, etc., vulcanizing and molding the rubber, and removing the vulcanized rubber from the mold. At this time, in order to facilitate the removal of vulcanized rubber from the mold, the mold or unvulcanized rubber is coated with a release agent.

Silicone is used as the release agent, but the release agent gets stuck to the rubber hose after vulcanization and a detergent, etc. needs to be used for removing it. Hence, improvement of washability is desired. For that, a release agent capable of being removed with water has been proposed, and, for example, Patent Document 1 discloses an alkylene oxide adduct of diamine.

BACKGROUND ART DOCUMENTS

Patent Documents

Patent Document 1: JP-A-7-292236

SUMMARY OF THE INVENTION

Problems that the Invention is to Solve

However, the release agent described in Patent Document 1 must be used in a large amount, for example, by increasing the applied concentration so as to obtain sufficient mold releasability. Specifically, in Patent Document 1, the alkylene oxide adduct of diamine is used at a concentration of 100% or 50%, but in general, when the amount used is increased, the washability deteriorates.

An object of the present invention is to provide a release agent excellent in mold releasability and washability.

Means for Solving the Problems

The release agent for vulcanized rubber molding of the present invention contains an alkylene oxide adduct (A) of an active hydrogen group-containing compound having four active hydrogen atoms in a molecule thereof, in which the alkylene oxide adduct (A) of the active hydrogen group-containing compound has a number average molecular weight of 5,000 to 30,000 and contains from 50 to 95 mass % of an oxyethylene group.

Advantages of the Invention

The above-described release agent for vulcanized rubber molding is excellent in mold releasability and washability.

MODE FOR CARRYING OUT THE INVENTION

The release agent for vulcanized rubber molding according to the present embodiment contains an alkylene oxide adduct (A) of an active hydrogen group-containing compound, the active hydrogen group-containing compound having four active hydrogen atoms in its molecule. The alkylene oxide adduct (A) of the active hydrogen group-containing compound has a structure in which four polyoxyalkylene chains are bonded to residues of the active hydrogen group-containing compound. Here, the residue of the active hydrogen group-containing compound indicates a group obtained by removing a hydrogen atom of an alkylene oxide-added active hydrogen group (a hydroxyl group or an amino group) from the active hydrogen group-containing compound.

In the present embodiment, the alkylene oxide adduct (A) of the active hydrogen group-containing compound has a number average molecular weight (Mn) of 5,000 to 30,000 and contains from 50 to 95 mass % of an oxyethylene group. In the alkylene oxide adduct having a structure in which four polyoxyalkylene chains are bonded as described above, the molecular weight and the oxyethylene group content are set high, so that excellent mold releasability can be exerted even with a small use amount and washability can be enhanced while facilitating easy dissolution in water. In addition, since the release agent has excellent washability and can be removed in a short time, productivity of the vulcanized rubber can be enhanced.

The active hydrogen group-containing compound includes various compounds each having four active hydrogen atoms in the molecule. The compound includes, for example, a compound having four hydroxyl groups, such as erythritol, pentaerythritol, sorbitan and diglycerine, and also includes a compound having two primary amino groups (—$NH_2$), for example, an aliphatic diamine such as ethylenediamine, propylenediamine, trimethylenediamine, tetramethylenediamine, pentamethylenediamine and hexamethylenediamine, and an aromatic diamine such as tolylenediamine, diaminoxylene, phenylenediamine, naphthalenediamine, benzidine, 2,4'-diaminobiphenyl and 4,4'-diaminodiphenylmethane. In addition, the compound may be a compound having one primary amino group and two secondary amino groups (—NH—) or a compound having four secondary amino groups. Furthermore, a compound containing a hydroxyl group and an amino group and having a total of four active hydrogen atoms, such as 2-(2-aminoethylamino)ethanol, N-(3-hydroxypropyl)ethylenediamine, N-(β-aminoethyl)isopropanolamine, 1-aminopropanediol, 2-amino-2-methyl-1,3-propanediol and 2-amino-2-ethyl-1,3-propanediol, may be used. One of these active hydrogen-containing compounds may be used alone, or two or more thereof may be used in combination.

In one embodiment, the active hydrogen group-containing compound is preferably a compound having four hydroxyl groups, more preferably a tetrahydric alcohol having a carbon number of 3 to 6 (which may have an ether bond in the molecule), and is preferably, for example, at least one member selected from the group consisting of erythritol, pentaerythritol, sorbitan, and diglycerine.

The alkylene oxide added to the active hydrogen group-containing compound may be ethylene oxide alone, but it is preferable to use ethylene oxide and other alkylene oxide in combination. In one embodiment, ethylene oxide and propylene oxide and/or butylene oxide may be used, and more specifically, ethylene oxide and propylene oxide are preferably used in combination because of excellent washability.

In the case of adding two or more alkylene oxides, the addition form may be block addition, random addition, or a combination thereof. That is, the polyoxyalkylene chain may be a block or random adduct of an oxyethylene group and other oxyalkylene group, or a combination of a block adduct and a random adduct, and in the case of a block adduct, as for the addition order of an oxyethylene group and other oxyalkylene group, either group may be added first. In one embodiment, the alkylene oxide adduct (A) of the active hydrogen group-containing compound is preferably a random adduct of ethylene oxide and propylene oxide, that is, the polyoxyalkylene chain is preferably a random adduct of an oxyethylene group and an oxypropylene group, and in this case, the mold releasability can be more enhanced.

In one embodiment, the added amount (average number of moles added) of the alkylene oxide is preferably from 100 to 600 mol, more preferably from 120 to 450 mol, per mol of the active hydrogen group-containing compound, and may be from 150 to 300 mol. The added amount (average number of moles added) of ethylene oxide is preferably from 80 to 570 mol, more preferably from 100 to 400 mol, per mol of the active hydrogen group-containing group, and may be from 120 to 250 mol. In the case of using ethylene oxide and propylene oxide in combination as the alkylene oxide, the ratio of average number of moles added of both (ethylene oxide/propylene oxide) is preferably from 3 to 15, more preferably from 4 to 10. Here, the average number of moles added can be determined by $^1$H-NMR (solvent: $CDCl_3$).

The method for adding the alkylene oxide is not particularly limited, and a known method, for example, a method where the alkylene oxide is introduced into a reaction vessel so as to make 70 to 120° C. and from 0 to 0.3 MPa in the presence of the active hydrogen group-containing compound and a catalyst and thereby reacted with the active hydrogen group-containing compound, may be used. The catalyst is not particularly limited but includes, for example, alkali metals such as potassium hydroxide and sodium hydroxide, and alkaline earth metals such as calcium hydroxide and magnesium hydroxide.

In the present embodiment, for the alkylene oxide adduct (A) of an active hydrogen group-containing compound, an alkylene oxide adduct having a number average molecular weight (Mn) of 5,000 to 30,000 is used as described above. When the number average molecular weight is 5,000 or more, the releasability of rubber after vulcanization from the mold can be enhanced, despite a small use amount (for example, despite use at a low concentration). In addition, when the number average molecular weight is 30,000 or less, reduction in workability can be prevented by preventing a rise in viscosity of the release agent. The number average molecular weight is more preferably from 6,000 to 25,000, still more preferably from 7,000 to 22,000.

In the present embodiment, the alkylene oxide adduct (A) of an active hydrogen group-containing compound contains from 50 to 95 mass % of an oxyethylene group as described above. That is, the content of an oxyethylene group in the alkylene oxide adduct (A) of an active hydrogen group-containing compound is from 50 to 95 mass %. The content of an oxyethylene group is set high in this way, and washability can thereby be enhanced while facilitating easy dissolution in water, as a result, in cooperation with the above-described setting of the molecular weight, the release agent exhibits excellent washability and mold releasability. The content of an oxyethylene group is more preferably from 60 to 95 mass %, still more preferably from 65 to 90 mass %, and may be from 70 to 90 mass %. Here, the content of an oxyethylene group can be determined by $^1$H-NMR (solvent: $CDCl_3$).

In one embodiment, the alkylene oxide adduct (A) of an active hydrogen group-containing compound preferably has an average hydroxyl value of 5 to 50 mgKOH/g. Within this range, the release agent more excels in mold releasability and washability. The average hydroxyl value is more preferably from 8 to 40 mgKOH/g, still more preferably from 10 to 35 mgKOH/g. Here, the average hydroxyl value can be measured in conformity with JIS K0070.

The release agent for vulcanized rubber molding according to the present embodiment may be composed of only the alkylene oxide adduct (A) of an active hydrogen group-containing compound but may be diluted with a solvent such as water. The release agent is preferably diluted with water and in view of washability and mold releasability, the concentration of the alkylene oxide adduct (A) of an active hydrogen group-containing compound is preferably from 5 to 70 mass %, more preferably from 20 to 50 mass %.

The release agent for vulcanized rubber molding according to the present embodiment may contain other components such as nonionic surfactant, anionic surfactant and silicone to the extent not inhibiting the effects thereof.

The release agent for vulcanized rubber molding according to the present embodiment may be used as a release agent at the time of molding of various vulcanized rubbers. For example, the release agent may be used for vulcanization molding of known rubber such as acrylonitrile-butadiene copolymer rubber (NBR), ethylene•propylene•diene copolymer rubber (EPDM), rubber (NBR/PVC) obtained by blending NBR and polyvinyl chloride (PVC), acrylic rubber (ACM), and fluororubber (FKM).

Vulcanization molding of the rubber can be performed by a conventional method. For example, the release agent according to the present embodiment is applied to a mold and/or applied to unvulcanized rubber, thereby providing the release agent to a region where the unvulcanized rubber and the mold are put into contact, and the unvulcanized rubber may be then loaded into the mold and subjected to heating and vulcanization. After vulcanization, the vulcanized molded rubber is removed from the mold, and the release agent attached to the rubber surface is washed with water, warm water, etc. to obtain vulcanized rubber. As for the unvulcanized rubber, for example, a rubber composition having blended therein, together with the rubber above, a known additive such as vulcanizing agent, vulcanization aid, processing aid, plasticizer, process oil, carbon black, white filler and antioxidant may be used.

EXAMPLES

The present invention is described in greater detail below by referring to Examples, but the present invention is not limited thereto.

The method for measuring the number average molecular weight is as follows.

Number Average Molecular Weight

The number average molecular weight is determined by the GPC method. The GPC apparatus and analysis conditions are as follows. A value obtained by calibrating the measured value with use of, as the standard sample, a polyethylene glycol having a molecular weight of 327, 2,000, 8,250 and 19,700 was used.

GPC apparatus: System controller: SCL-10A (manufactured by Shimadzu Corporation)

Detector: RID-10A (manufactured by Shimadzu Corporation)

Column: Shodex GPC KF-G, KF-803, KF802.5, KF-802, and KF-801, which are connected together (all produced by Showa Denko K.K.)

Eluent: tetrahydrofuran
Sample injection: 0.5 wt % solution, 80 µL
Flow rate: 0.8 mL/min
Temperature: 25° C.
Raw materials used in Examples are as follows.

Production Example 1

Into a stainless steel-made autoclave, 136 g (1 mol) of pentaerythritol and 3 g of potassium hydroxide were charged, followed by nitrogen purging of the inside of the reactor. The temperature was raised to 100° C., and a mixture of 5,500 g (125 mol) of ethylene oxide and 1,392 g (24 mol) of propylene oxide was introduced while keeping the internal pressure at 0.3 MPa or less. After completion of the introduction, the reaction was allowed to further proceed at 100° C. for 2 hours to obtain a propylene oxide (24 mol)/ethylene oxide (125 mol) random adduct (A-1) of pentaerythritol.

Details of the obtained alkylene oxide adduct (A-1) are shown in Table 1 below. In Kind and Use Amount of Alkylene Oxide of the Table, PO (g) and PO (mol) indicate the use amount of propylene oxide, EO (g) and EO (mol) indicate the use amount of ethylene oxide, and both are the use amount per mol of the active hydrogen group-containing compound (in A-1, pentaerythritol). In addition, EO (%) is the content (mass %) of an oxyethylene group in the obtained alkylene oxide adduct. Mn and OHV respectively indicate the number average molecular weight and the average hydroxyl value (mgKOH/g) of the obtained alkylene oxide adduct. The same applies to the following (A-2) to (A-10), (B-1) and (B-2).

Production Examples 2 to 6

Propylene oxide/ethylene oxide random adducts (A-2) to (A-6) of pentaerythritol were obtained by performing the same operation as in Production Example 1 except that the use amounts of ethylene oxide and propylene oxide were changed as shown in Table 1.

Production Example 7

Into a stainless steel-made autoclave, 136 g (1 mol) of pentaerythritol and 3 g of potassium hydroxide were charged, followed by nitrogen purging of the inside of the reactor. The temperature was raised to 100° C., and 1,798 g (31 mol) of propylene oxide was introduced while keeping the internal pressure at 0.3 MPa or less. After completion of the introduction, the reaction was allowed to further proceed at 100° C. for 2 hours. Subsequently, 7,084 g (161 mol) of ethylene oxide was introduced while keeping the internal pressure at 0.3 MPa or less. After completion of the introduction of ethylene oxide, the reaction was allowed to proceed at 100° C. for 2 hours to obtain a propylene oxide (31 mol)/ethylene oxide (161 mol) block adduct (A-7) of pentaerythritol.

Production Example 8

A propylene oxide (30 mol)/ethylene oxide (161 mol) random adduct (A-8) of sorbitan was obtained by performing the same operation as in Production Example 1 except that 164 g (1 mol) of sorbitan was used in place of pentaerythritol and the use amounts of ethylene oxide and propylene oxide were changed as shown in Table 1.

Production Example 9

A propylene oxide (31 mol)/ethylene oxide (161 mol) random adduct (A-9) of erythritol was obtained by performing the same operation as in Production Example 1 except that 122 g (1 mol) of erythritol was used in place of pentaerythritol and the use amounts of ethylene oxide and propylene oxide were changed as shown in Table 1.

Production Example 10

A propylene oxide (30 mol)/ethylene oxide (161 mol) random adduct (A-10) of diglycerine was obtained by performing the same operation as in Production Example 1 except that 166 g (1 mol) of diglycerine was used in place of pentaerythritol and the use amounts of ethylene oxide and propylene oxide were changed as shown in Table 1.

Comparative Production Examples 1 and 2

Propylene oxide-ethylene oxide block adducts (B-1) and (B-2) of ethylenediamine were obtained by performing the same operation as in Production Example 7 except that 60 g (1 mol) of ethylenediamine was used in place of pentaerythritol and the use amounts of propylene oxide and ethylene oxide were changed as shown in Table 1.
(B-3)
Dimethylpolysiloxane (trade name: KF-96-20CS, produced by Shin-Etsu Chemical Co., Ltd.)

TABLE 1

| | Active Hydrogen Group-Containing Compound | Kind and Use Amount of Alkylene Oxide | | | | Addition Form | EO (%) | Mn | OHV |
|---|---|---|---|---|---|---|---|---|---|
| | | PO (g) | PO (mol) | EO (g) | EO (mol) | | | | |
| A-1 | pentaerythritol | 1392 | 24 | 5500 | 125 | random | 78 | 7000 | 32 |
| A-2 | pentaerythritol | 1798 | 31 | 7084 | 161 | random | 79 | 9000 | 25 |
| A-3 | pentaerythritol | 2378 | 41 | 9504 | 216 | random | 79 | 12000 | 19 |
| A-4 | pentaerythritol | 3944 | 68 | 15884 | 361 | random | 80 | 20000 | 11 |
| A-5 | pentaerythritol | 2668 | 46 | 6204 | 141 | random | 69 | 9000 | 25 |
| A-6 | pentaerythritol | 870 | 15 | 7964 | 181 | random | 89 | 9000 | 25 |
| A-7 | pentaerythritol | 1798 | 31 | 7084 | 161 | block | 79 | 9000 | 25 |
| A-8 | sorbitan | 1740 | 30 | 7084 | 161 | random | 79 | 9000 | 25 |
| A-9 | erythritol | 1798 | 31 | 7084 | 161 | random | 79 | 9000 | 25 |
| A-10 | diglycerine | 1740 | 30 | 7084 | 161 | random | 79 | 9000 | 25 |
| B-1 | ethylenediamine | 870 | 15 | 3564 | 81 | block | 79 | 4500 | 50 |
| B-2 | ethylenediamine | 6264 | 108 | 2684 | 61 | block | 30 | 9000 | 25 |

Examples 1 to 12 and Comparative Examples 1 to 3

Respective raw materials were mixed at the ratio (mass ratio) shown in Table 2 below to obtain release agents. Using each of the release agents, the following evaluations were performed.

Mold Releasability

Unvulcanized rubber (ethylene•propylene•diene rubber (EPDM) or acrylonitrile-butadiene copolymer rubber (NBR)) coated with the release agent was loaded into a mold (120 mm×120 mm×2 mm). Subsequently, a vulcanization treatment was performed at 150° C. for 1 hour, and the vulcanized rubber was removed from the mold. The workability in removal here was taken as the mold releasability and evaluated according to the following criteria by using Comparative Example 3 as the control. The results are shown in Table 2.

A: The workability is at the same level as in the case of using dimethylpolysiloxane, and the vulcanized rubber can be removed from the mold.

B: The workability is slightly inferior to that in the case of using dimethylpolysiloxane, but the vulcanized rubber can be removed from the mold.

C: The workability is poorer than in the case of using dimethylpolysiloxane, and the vulcanized rubber cannot be removed from the mold.

Washability

The vulcanized rubber obtained in the evaluation of mold releasability was immersed in 2 L of water (temperature: 80° C.) for 30 seconds, pulled out and checked whether the vulcanized rubber surface was slimy. If it was slimy, the vulcanized rubber was immersed in 2 L of newly prepared water (temperature: 80° C.) for 30 seconds, and this operation was repeated until the rubber surface became non-slimy or up to a total of three times. The washability was evaluated according to the following criteria. The results are shown in Table 2. Here, the vulcanized rubber surface being slimy indicates the release agent remains, and being non-slimy indicates the release agent does not remain.

A: The vulcanized rubber surface is non-slimy after first immersion.

B: The vulcanized rubber surface is non-slimy after second immersion.

C: The vulcanized rubber surface is non-slimy after third immersion.

D: The vulcanized rubber surface is slimy even after third immersion.

TABLE 2

|  |  | Example | | | | | | | | | | | | Comparative Example | | |
|---|---|---|---|---|---|---|---|---|---|---|---|---|---|---|---|---|
|  |  | 1 | 2 | 3 | 4 | 5 | 6 | 7 | 8 | 9 | 10 | 11 | 12 | 1 | 2 | 3 |
| Raw material | A-1 | 20 | | | | | | | | | | 10 | 30 | | | |
|  | A-2 | | 20 | | | | | | | | | | | | | |
|  | A-3 | | | 20 | | | | | | | | | | | | |
|  | A-4 | | | | 20 | | | | | | | | | | | |
|  | A-5 | | | | | 20 | | | | | | | | | | |
|  | A-6 | | | | | | 20 | | | | | | | | | |
|  | A-7 | | | | | | | 20 | | | | | | | | |
|  | A-8 | | | | | | | | 20 | | | | | | | |
|  | A-9 | | | | | | | | | 20 | | | | | | |
|  | A-10 | | | | | | | | | | 20 | | | | | |
|  | B-1 | | | | | | | | | | | | | 20 | | |
|  | B-2 | | | | | | | | | | | | | | 20 | |
|  | B-3 | | | | | | | | | | | | | | | 100 |
|  | Water | 80 | 80 | 80 | 80 | 80 | 80 | 80 | 80 | 80 | 80 | 90 | 70 | 80 | 80 | |
| Evaluation EPDM | | | | | | | | | | | | | | | | |
|  | Mold releasability | A | A | A | A | A | A | B | A | A | A | A | A | C | A | A |
|  | Washability | A | A | A | A | A | A | A | A | A | A | A | A | A | D | D |
| NBR | | | | | | | | | | | | | | | | |
|  | Mold releasability | A | A | A | A | A | A | B | A | A | A | A | A | C | A | A |
|  | Washability | A | A | A | A | A | A | A | A | A | A | A | A | A | D | D |

As seen from Table 2, in Comparative Example 3, dimethylpolysiloxane was used as the release agent, and the mold releasability was excellent but the washability was poor. In Comparative Example 1, an alkylene oxide adduct of ethylenediamine having four active hydrogen atoms in the molecule was used, but the molecular weight was small and therefore, sufficient mold releasability could not be exerted at the applied concentration of 20 mass %. In Comparative Example 2, an alkylene oxide adduct of ethylenediamine was used, but the content of an oxyethylene group was small, and the washability was poor.

On the other hand, in Examples 1 to 12 using an alkylene oxide adduct of an active hydrogen group-containing compound having four active hydrogen atoms in the molecule, in which the adduct had predetermined molecular weight and oxyethylene group content, sufficient mold releasability could be exerted even at a low applied concentration of 10 to 30 mass %, and mold releasability and washability were excellent. In addition, it was seen from comparison of Example 7 with other Examples that as the alkylene oxide addition form, random addition is more advantageous in terms of mold releasability than block addition.

The invention claimed is:

1. A release agent for vulcanized rubber molding comprising an alkylene oxide adduct (A) of an active hydrogen group-containing compound, the active hydrogen group-containing compound having four active hydrogen atoms in a molecule thereof, wherein:
   the alkylene oxide adduct (A) has four polyoxyalkylene chains, and
   the alkylene oxide adduct (A) has a number average molecular weight of 5,000 to 30,000 and contains from 50 to 95 mass % of an oxyethylene group.

2. The release agent for vulcanized rubber molding according to claim 1, wherein the active hydrogen group-containing compound has four hydroxyl groups in the molecule.

3. The release agent for vulcanized rubber molding according to claim 1, wherein
   an average number of moles of the alkylene oxide adduct (A) is from 100 to 600 mol per mol of the active hydrogen group-containing compound.

4. The release agent for vulcanized rubber molding according to claim 1, wherein the alkylene oxide comprises ethylene oxide and propylene oxide, and
   a ratio of average number of moles of ethylene oxide/propylene oxide is from 3 to 15.

5. The release agent for vulcanized rubber molding according to claim 1, wherein, the active hydrogen group-containing compound is at least one compound selected from the group consisting of erythritol, pentaerythritol, sorbitan, and diglycerine.

6. The release agent for vulcanized rubber molding according to claim 1, wherein
   the alkylene oxide adduct (A) has the number average molecular weight of 7,000 to 22,000.

* * * * *